United States Patent
Kurihara et al.

[11] Patent Number: 5,449,448
[45] Date of Patent: Sep. 12, 1995

[54] METHOD OF MANUFACTURING ANODE FOIL FOR ALUMINIUM ELECTROLYTIC CAPACITORS

[75] Inventors: Naomi Kurihara, Hirakata; Kazuo Okamura, Joyo; Yoshihito Yoshimura, Joyo; Tetsuo Sonoda, Joyo; Kouichi Kojima, Hirakata, all of Japan

[73] Assignee: Matsushita Electric Industrial Co., Ltd., Osaka, Japan

[21] Appl. No.: 212,574

[22] Filed: Mar. 16, 1994

[30] Foreign Application Priority Data

Mar. 19, 1993 [JP] Japan ................ 5-059938

[51] Int. Cl.$^6$ ............ C25D 11/04; C25D 11/16
[52] U.S. Cl. ................... 205/153; 205/188; 205/213; 204/129.1; 204/140
[58] Field of Search ........... 204/140, 129.35, 129.95, 204/129.4; 205/153, 213, 188, 190

[56] References Cited

U.S. PATENT DOCUMENTS

| | | | |
|---|---|---|---|
| 3,666,642 | 5/1972 | Alwan et al. | 204/140 X |
| 4,276,129 | 6/1981 | Kanzaki et al. | 204/129.4 X |
| 5,064,511 | 11/1991 | Gobbetti | 204/129.95 X |
| 5,143,591 | 9/1992 | Shaffer | 205/153 X |

OTHER PUBLICATIONS

Database WPI, Section CH, Week 8521, Derwent Publications Ltd., London, GB; Class L03, AN 85-126417 & JP-A-60 065 517 (Matsushita Elec Ind KK) 15 Apr. 1985.

Patent Abstracts of Japan, vol. 16, No. 521 (E-1285) 27 Oct. 1992 & JP-A-04 196 304 (Elna Co Ltd) 16 Jul. 1992.

Patent Abstracts of Japan, vol. 14, No. 51 (E-1001) 14 Nov. 1990 & JP-A-02 216 811 (Elna Co Ltd) 29 Aug. 1990.

*Primary Examiner*—Donald R. Valentine
*Attorney, Agent, or Firm*—Stevens, Davis, Miller & Mosher

[57] ABSTRACT

This invention includes a first step for dipping etched aluminium foil into pure water of high temperature for a predetermined period of time, a second step for dipping the aluminium foil into an aqueous solution containing an organic acid and at least one kind of a salt thereof after the first step, and a third step for subjecting the aluminium foil to a forming treatment in an electrolytic solution after the second step, wherein either straight saturated dicarboxylic acid having an odd number of carbons or trans-straight unsaturated dicarboxylic acid is used or organic acid having an aromatic ring and a carboxyl group is used as the organic acid in the second step, whereby leakage current characteristics are improved by weakening a dissolving action to a hydrated film and strengthening a bonding action to the hydrated film.

12 Claims, No Drawings

METHOD OF MANUFACTURING ANODE FOIL FOR ALUMINIUM ELECTROLYTIC CAPACITORS

BACKGROUND OF THE INVENTION

1. Field of the Invention

The present invention relates to a method of manufacturing anode foil for aluminium electrolytic capacitors, and more specifically, to a method of manufacturing anode foil for aluminium electrolytic capacitors by which the leakage current characteristics of the anode foil at medium and high voltages are improved.

2. Description of the Related Art

Recently, as electronic appliance sets are miniaturized and their reliability is increased, the requirements for the miniaturization and improvement of reliability of aluminium electrolytic capacitors are rapidly increasing. Therefore, the capacitance and leakage current characteristics of anode foil for aluminium electrolytic capacitors (hereinafter, referred to as anode foil) must be improved.

Conventionally, as disclosed in Japanese Patent Unexamined Publication No. Sho 59-89796, there is proposed a method of manufacturing aluminium foil for electrolytic capacitors as a method of manufacturing anode foil for medium and high voltage usage and this method comprises a first step for boiling aluminium foil with pure water, a second step for dipping the aluminium foil into a weak acid solution after the first step and a third step for subjecting the aluminium foil to a forming treatment after the second step.

Nevertheless, this conventional method of manufacturing anode foil is disadvantageous in that since weak acid is bonded with a hydrated film produced by the boiling with the pure water as well as the weak acid dissolves the hydrated film, the forming film formed at the next step is made more defective and leakage current characteristics are made insufficient by it.

SUMMARY OF THE INVENTION

An object of the present invention for solving the conventional problem is to provide a method of manufacturing anode foil for aluminium electrolytic capacitors by which leakage current characteristics can be improved.

DESCRIPTION OF THE PREFERRED EMBODIMENT

An embodiment of the present invention will be described below.

Etched aluminium foil was dipped into pure water having a temperature of 98° C. for 10 minutes at a first step so that a hydrated film was formed on the surface of the etched foil. Next, a second step was carried out to dip the aluminium foil into aqueous solutions of examples 1 to 4 of the present invention shown in Table 1. Note, the solutions had a concentration of 5g/1 and a process was carried out for 5 minutes at 85° C. Following the dipping process, a third step was carried out to subject the aluminium foil to a forming treatment in the state that a voltage of 300V was applied to the foil in an electrolytic solution having a temperature of 90° C. and containing adipic acid ammonium in an amount of 10g/1 for 15 minutes. For comparison, conventional examples 1 and 2 for which succinic acid and maleic acid were used in the processing solution at the second step and a comparative example not having the second step for dipping aluminium foil into an aqueous solution of an organic acid were used, as shown in Table 1. Thereafter, respective foils were subjected to a heat treatment at 500° C. for three minutes and then to a forming treatment again in an electrolytic solution containing boric acid in an amount of 50g/1 and boric acid ammonium in an amount of 50g/1 with a voltage of 300V applied to the foils for five minutes.

Table 1 summarizes a result of measurement of the leakage currents of the anode foils made by the aforesaid method. The leakage current values shown in Table 1 were obtained when a voltage of 300V was applied for 1 minute in the electrolytic solution for the second forming treatment.

TABLE 1

|  | Processing Liquid at Second Step | Leakage Current (mA/cm$^2$) |
| --- | --- | --- |
| Conventional Example | Succinic Acid | 1.38 |
| Conventional Example 2 | Maleic Acid | 1.52 |
| Comparative Example | Nil | 2.41 |
| Example 1 | Malonic Acid | 0.65 |
| Example 2 | Glutaric Acid | 0.76 |
| Example 3 | Pumaric Acid | 0.49 |
| Example 4 | Benzoic Acid | 0.81 |

As apparent from Table 1, the examples 1 to 4 of the present invention have leakage current values which are reduced by about 30 to 50% as compared with those of the conventional examples 1 and 2, whereas the comparative example exhibits a leakage current value which is considerably higher than those of the conventional examples because it does not have the second step for dipping the foil into the aqueous solution of organic acid.

Note, the malonic acid and glutaric acid of the examples 1 and 2 of the present invention shown in Table 1 are an organic acid composed of straight saturated dicarboxylic acid having an odd number of carbons, and the fumaric acid of the example 3 of the present invention is an organic acid composed of trans-straight unsaturated dicarboxylic acid, and further the benzoic acid of the example 4 of the present invention is composed of organic acid having an aromatic ring and a carboxyl group.

Further, although the examples 1 to 4 of the present invention dip the aluminium foil, which has been dipped into the pure water of high temperature at the first step, into an aqueous solution containing an organic acid such as malonic acid, glutaric acid, fumaric acid, benzoic acid etc., even if the aluminium foil, which has been dipped into the pure water of high temperature at the first step, is dipped into an aqueous solution containing a salt of the above organic acids and two or more kinds of organic acid, aqueous solution containing two or more kinds of organic acid salt and aqueous solution of a mixture of an organic acid and an organic acid salt in addition to the above organic acid, substantially the same leakage current value as those of the examples 1 to 4 of the present invention can be exhibited.

As described above, according to the method of manufacturing anode electrode for aluminium electrolytic capacitors of the present invention, since the first step for dipping etched aluminium foil into pure water of high temperature for a predetermined period of time is followed by the second step for dipping the aluminium foil into an aqueous solution containing organic acid and at least one kind of salt thereof, and either straight saturated dicarboxylic acid having an odd number of carbons or trans-straight unsaturated dicarboxylic acid is used or an organic acid having an aromatic ring or a carboxyl group is used as the organic acid. Therefore, a dissolving action to a hydrated film is weakened and a bonding action to the hydrated film is strengthened as compared with a conventional method, whereby anode foil for aluminium electrolytic capacitors excellent in leakage voltage characteristics can be obtained.

What is claimed is:

1. A method of manufacturing anode foil for aluminium electrolytic capacitors, comprising:
    a first step for dipping etched aluminium foil into pure water of high temperature;
    a second step for dipping said aluminium foil into an aqueous solution of high temperature containing at least one member selected from the group consisting of straight saturated dicarboxylic acids having an odd number of carbons, trans-straight unsaturated dicarboxylic acids and the salts thereof after said first step; and
    a third step for subjecting said aluminium foil to a forming treatment in an electrolytic solution after said second step.

2. The method of claim 1, further comprising:
    a fourth step of heating said aluminum foil after said forming step; and
    a fifth step of subjecting said aluminum foil to another forming step in another electrolyte solution after said fourth step.

3. The method of claim 1, wherein said member is selected from the group consisting of at least one straight saturated dicarboxylic acid having an odd number of carbons or the salt thereof.

4. The method of claim 1, wherein said member is selected from the group consisting of at least one trans-straight unsaturated dicarboxylic acid or salt thereof.

5. The method of claim 1, wherein said member is malonic acid or salt thereof.

6. The method of claim 1, wherein the first step occurs in the absence of current being applied to its water and the second step occurs in the absence of current being applied to its aqueous solution.

7. The method of claim 1, wherein the aqueous solution of the second step consists essentially of water and said member.

8. A method of manufacturing anode foil for aluminium electrolytic capacitors, comprising:
    a first step for dipping etched aluminium foil into pure water of high temperature;
    a second step for dipping said aluminium foil into an aqueous solution containing at least one member selected from the group consisting of organic acids having an aromatic ring and a carboxyl group and the salts thereof after said first step; and
    a third step for subjecting said aluminium foil to a forming treatment in an electrolytic solution after said second step.

9. The method of claim 8, wherein the second step occurs while the aqueous solution is at a high temperature.

10. The method of claim 8, further comprising:
    a fourth step of heating said aluminum foil after said forming step; and
    a fifth step of subjecting said aluminum foil to another forming step in another electrolyte solution after said fourth step.

11. The method of claim 8, wherein the first step occurs in the absence of current being applied to its water and the second step occurs in the absence of current being applied to its aqueous solution.

12. The method of claim 8, wherein the aqueous solution of the second step consists essentially of water and said member.

* * * * *